United States Patent
Shimizu et al.

(10) Patent No.: US 10,868,727 B2
(45) Date of Patent: Dec. 15, 2020

(54) ADAPTIVE BEAMWIDTH CONTROL FOR MILLIMETER WAVE V2X COMMUNICATIONS

(71) Applicant: TOYOTA JIDOSHA KABUSHIKI KAISHA, Toyota (JP)

(72) Inventors: Takayuki Shimizu, Mountain View, CA (US); Gaurav Bansal, Mountain View, CA (US)

( * ) Notice: Subject to any disclaimer, the term of this patent is extended or adjusted under 35 U.S.C. 154(b) by 43 days.

(21) Appl. No.: 16/254,593

(22) Filed: Jan. 23, 2019

(65) Prior Publication Data

US 2020/0235997 A1 Jul. 23, 2020

(51) Int. Cl.
 *H04L 12/24* (2006.01)
 *H04W 4/029* (2018.01)
 *H04W 4/40* (2018.01)

(52) U.S. Cl.
 CPC ........ *H04L 41/0896* (2013.01); *H04W 4/029* (2018.02); *H04W 4/40* (2018.02)

(58) Field of Classification Search
 None
 See application file for complete search history.

(56) References Cited

U.S. PATENT DOCUMENTS

| | | | |
|---|---|---|---|
| 2018/0343605 A1* | 11/2018 | Wu | H04B 7/088 |
| 2019/0043369 A1* | 2/2019 | Miller | H04W 4/029 |
| 2019/0045348 A1* | 2/2019 | Li | H04W 16/28 |
| 2019/0253117 A1* | 8/2019 | Raghavan | H04B 17/327 |

FOREIGN PATENT DOCUMENTS

| | | |
|---|---|---|
| JP | PO2004-072268 | 3/2004 |
| WO | 2018131934 | 7/2018 |

OTHER PUBLICATIONS

EPO, Extended European Search Report for European Patent Application No. 20151624.2, Feb. 17, 2020, 6 pages.

\* cited by examiner

*Primary Examiner* — Jamaal Henson
(74) *Attorney, Agent, or Firm* — Burbage Law, P.C.; Jon-Michael Burbage; Elizabeth Ruzich

(57) ABSTRACT

The disclosure includes embodiments for adaptively controlling a beamwidth setting for a millimeter wave (mmWave) communication between a first endpoint and a second endpoint. In some embodiments, a method for the first endpoint includes exchanging position data and position accuracy data with a second endpoint via a non-mmWave type channel of a vehicle-to-everything (V2X) radio. The method includes adjusting a beamwidth setting for a mmWave channel of the V2X radio based on the position data and the position accuracy data. The method includes performing a beam alignment for the mmWave channel of the V2X radio based on the beamwidth setting to modify an operation of the V2X radio so that the V2X radio exchanges a mmWave communication with the second endpoint using the beam alignment indicated by the beamwidth setting.

20 Claims, 9 Drawing Sheets

ADAPTIVE BEAMWIDTH CONTROL FOR MILLIMETER WAVE V2X COMMUNICATIONS

BACKGROUND

The specification relates to adaptively controlling beamwidth settings for millimeter wave (mmWave) vehicle-to-everything (V2X) communications.

Radio waves in an Extremely High Frequency ("EHF") band (e.g., about 28 to 300 gigahertz ("GHz")) have wavelengths from ten to one millimeter and are consequently referred to as millimeter waves ("mmWave" or "mmWaves"). A challenge in mmWave communication includes beam alignment. The mmWave communication between two endpoints is not possible without first completing a beam alignment process between these two endpoints. For example, beamforming with narrow beams is needed to compensate high propagation loss at the mmWave band and appropriate beam pointing at both a receiver and a transmitter is needed. It is currently difficult or impossible to implement mmWave communication in vehicles because existing technologies cannot complete a beam alignment process in a timely fashion that is sufficiently quick for vehicular applications. For example, vehicles travel quickly on roadways, and if an endpoint for a mmWave communication is a vehicle (or worse yet, both endpoints for an mmWave communication are vehicles), then it is needed to execute a beam alignment process in a short amount of time.

An existing solution for beam alignment is known as "beam training by beam sweeping." This solution is not adequate for vehicle applications because it is designed for low mobility environments and does not work for high mobility environments such as present in vehicle applications.

SUMMARY

Described are embodiments of a modification system installed in an electronic control unit (ECU) of a first endpoint. The modification system is operable to adaptively control a beamwidth setting for a mmWave beam alignment between the first endpoint (e.g., an ego vehicle) and a second endpoint (e.g., a remote vehicle) so that a mmWave communication can be implemented between the first endpoint and the second endpoint.

In some embodiments, the modification system is installed in an ECU of the ego vehicle and is operable to adaptively determine a beamwidth setting for mmWave communications with the remote vehicle based on an estimated distance to the remote vehicle and an estimated position error for the estimated distance. The beamwidth setting is determined based in part on V2X feedback received from the remote vehicle. The modification system executes a mmWave beam alignment for a V2X radio of the ego vehicle based on the beamwidth setting. The modification system causes the V2X radio to execute a mmWave communication with the remote vehicle using the mmWave beam alignment. By comparison, there is no existing solution that adaptively determines a beamwidth setting for mmWave communications with a remote vehicle based on an estimated distance to the remote vehicle and an estimated position error for the estimated distance.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a method for a first endpoint, including: exchanging position data and position accuracy data with a second endpoint via a non-millimeter wave (non-mmWave) type channel of a vehicle-to-everything (V2X) radio; adjusting a beamwidth setting for a millimeter wave (mmWave) channel of the V2X radio based on the position data and the position accuracy data; and performing a beam alignment for the mmWave channel of the V2X radio based on the beamwidth setting to modify an operation of the V2X radio so that the V2X radio exchanges a mmWave communication with the second endpoint using the beam alignment indicated by the beamwidth setting. Other embodiments of this aspect include corresponding computer systems, apparatus, and computer programs recorded on one or more computer storage devices, each configured to perform the actions of the methods.

Implementations may include one or more of the following features. The method where adjusting the beamwidth setting for the mmWave channel of the V2X radio based on the position data and the position accuracy data includes: determining, based on the position data and the position accuracy data, an estimated distance between the first endpoint and the second endpoint and an estimated position error for the estimated distance; and determining the beamwidth setting for the mmWave channel of the V2X radio based on the estimated distance and the estimated position error. The method where the position data includes first position data describing a position of the first endpoint and second position data describing a position of the second endpoint, and the position accuracy data includes first position accuracy data describing an accuracy of the first position data and second position accuracy data describing an accuracy of the second position data. The method where determining, based on the position data and the position accuracy data, the estimated distance between the first endpoint and the second endpoint and the estimated position error for the estimated distance includes: determining the estimated distance between the first endpoint and the second endpoint based on the first position data and the second position data; and determining the estimated position error for the estimated distance based on the first position accuracy data and the second position accuracy data. The method where exchanging the position data and the position accuracy data with the second endpoint via the non-mmWave type channel of the V2X radio includes: transmitting the first position data and the first position accuracy data to the second endpoint via the non-mmWave type channel; and receiving the second position data and the second position accuracy data from the second endpoint via the non-mmWave type channel. The method where performing the beam alignment for the mmWave channel of the V2X radio based on the beamwidth setting to modify the operation of the V2X radio includes: sweeping a beam of the V2X radio to align the beam of the V2X radio with the second endpoint so that one or more beam lobes with a beamwidth determined by the beamwidth setting are selected for the mmWave channel of the V2X radio. The method where the mmWave communication with the second endpoint is performed using the one or more beam lobes. The method where the one or more beam lobes are selected at the first endpoint such that the beamwidth is maximized while at least one of a communication range requirement and a signal-to-noise ratio requirement is also met during the mmWave communication. The method where the beamwidth setting provides an improved mmWave communication performance for the V2X radio that includes one or more of a reduction of beam alignment errors and a reduction of beam alignment overhead. The method further including: receiving V2X feedback data from the second endpoint via one or more of the non-mmWave type channel and the mmWave channel. The method where the beamwidth setting for the mmWave channel of the V2X radio is adjusted further based on the V2X feedback data. Implementations of the described techniques may include hardware, a method or process, or computer software on a computer-accessible medium.

One general aspect includes a system including an onboard vehicle computer system of a first endpoint including a non-transitory memory storing computer code which, when executed by the onboard vehicle computer system, causes the onboard vehicle computer system to: exchange position data and position accuracy data with a second endpoint via a non-millimeter wave (non-mmWave) type channel of a vehicle-to-everything (V2X) radio; adjust a beamwidth setting for a millimeter wave (mmWave) channel of the V2X radio based on the position data and the position accuracy data; and perform a beam alignment for the mmWave channel of the V2X radio based on the beamwidth setting to modify an operation of the V2X radio so that the V2X radio exchanges a mmWave communication with the second endpoint using the beam alignment indicated by the beamwidth setting. Other embodiments of this aspect include corresponding computer systems, apparatus, and computer programs recorded on one or more computer storage devices, each configured to perform the actions of the methods.

Implementations may include one or more of the following features. The system where the computer code, when executed by the onboard vehicle computer system, causes the onboard vehicle computer system to adjust the beamwidth setting for the mmWave channel of the V2X radio based on the position data and the position accuracy data at least by: determining, based on the position data and the position accuracy data, an estimated distance between the first endpoint and the second endpoint and an estimated position error for the estimated distance; and determining the beamwidth setting for the mmWave channel of the V2X radio based on the estimated distance and the estimated position error. The system where the position data includes first position data describing a position of the first endpoint and second position data describing a position of the second endpoint, and the position accuracy data includes first position accuracy data describing an accuracy of the first position data and second position accuracy data describing an accuracy of the second position data. The system where the computer code, when executed by the onboard vehicle computer system, causes the onboard vehicle computer system to determine, based on the position data and the position accuracy data, the estimated distance between the first endpoint and the second endpoint and the estimated position error for the estimated distance at least by: determining the estimated distance between the first endpoint and the second endpoint based on the first position data and the second position data; and determining the estimated position error for the estimated distance based on the first position accuracy data and the second position accuracy data. The system where the computer code, when executed by the onboard vehicle computer system, causes the onboard vehicle computer system to exchange the position data and the position accuracy data with the second endpoint via the non-mmWave type channel of the V2X radio at least by: transmitting the first position data and the first position accuracy data to the second endpoint via the non-mmWave type channel; and receiving the second position data and the second position accuracy data from the second endpoint via the non-mmWave type channel. The system where the computer code, when executed by the onboard vehicle computer system, causes the onboard vehicle computer system to perform the beam alignment for the mmWave channel of the V2X radio based on the beamwidth setting to modify the operation of the V2X radio at least by: sweeping a beam of the V2X radio to align the beam of the V2X radio with the second endpoint so that one or more beam lobes with a beamwidth determined by the beamwidth setting are selected for the mmWave channel of the V2X radio. The system where the mmWave communication with the second endpoint is performed using the one or more beam lobes. The system where the one or more beam lobes are selected at the first endpoint such that the beamwidth is maximized while one or more of a communication range requirement and a signal-to-noise ratio requirement is also met during the mmWave communication. Implementations of the described techniques may include hardware, a method or process, or computer software on a computer-accessible medium.

One general aspect includes a computer program product including a non-transitory memory of an onboard vehicle computer system of a first endpoint storing computer-executable code that, when executed by a processor, causes the processor to: exchange position data and position accuracy data with a second endpoint via a non-millimeter wave (non-mmWave) type channel of a vehicle-to-everything (V2X) radio; adjust a beamwidth setting for a millimeter wave (mmWave) channel of the V2X radio based on the position data and the position accuracy data; and perform a beam alignment for the mmWave channel of the V2X radio based on the beamwidth setting to modify an operation of the V2X radio so that the V2X radio exchanges a mmWave communication with the second endpoint using the beam alignment indicated by the beamwidth setting. Other embodiments of this aspect include corresponding computer systems, apparatus, and computer programs recorded on one or more computer storage devices, each configured to perform the actions of the methods.

Implementations may include one or more of the following features. The computer program product where the computer-executable code, when executed by the processor, causes the processor to adjust the beamwidth setting for the mmWave channel of the V2X radio based on the position data and the position accuracy data at least by: determining, based on the position data and the position accuracy data, an estimated distance between the first endpoint and the second endpoint and an estimated position error for the estimated distance; and determining the beamwidth setting for the mmWave channel of the V2X radio based on the estimated distance and the estimated position error. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
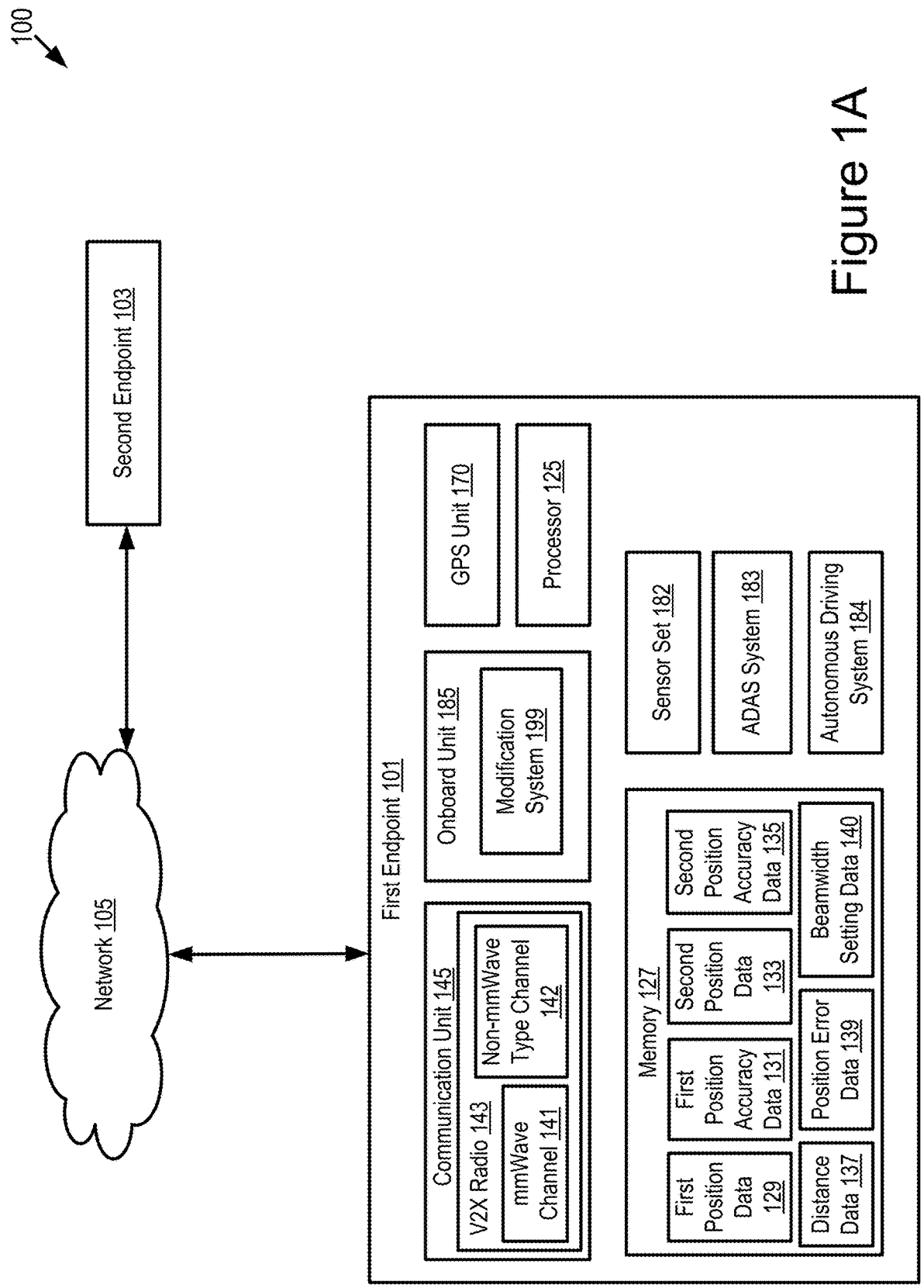
FIG. 1A is a block diagram illustrating an operating environment for a modification system according to some embodiments.

Deploying mmWave communication has become cheaper recently due to advancements in Complementary metal-oxide-semiconductor (CMOS) technology. Deploying mmWave communication in vehicles is desirable because future vehicles may require data rates with a magnitude of gigabits per second (Gbps) and mmWave communication is capable of providing Gbps data rates over short ranges.

Application of mmWave communication is beneficial since the mmWave communication enables communication devices to send and receive large amounts of data (e.g., 0 to 1000 gigabytes) in an amount of time that is acceptable to users or within some predetermined safety standard. The mmWave communication has a great potential for massive consumer applications (e.g., IEEE802.11ad/WiGig for high-speed and short-range communication; 5G cellular communications; automated driving applications, etc.). The automated driving applications include, but are not limited to: (1) sharing local sensor information recorded by sensors such as a LIDAR, radar, camera, etc., with connected vehicles and infrastructure devices to expand sensor coverage and obtain non-line-of-sight (NLOS) view so as to achieve a safer, efficient and proactive driving; (2) uploading local sensor information to a cloud server via infrastructures for high-definition (HD) 3D map generation at the cloud server so that a global HD 3D map can be kept updated: and (3) downloading a HD 3D map for automated driving from infrastructures on demand when a vehicle enters a new city so that there is no need to store all 3D map data of an entire country in the vehicle's storage and it is easy to keep the 3D map data updated. Transmission and reception of HD 3D maps and vehicle sensor information has many applications. One application that may benefit from the ability to transmit and receive HD 3D maps and vehicle sensor information is automated vehicles, drones, and robots.

For example, mmWave communication may be used to communicate with (1) roadside equipment or (2) other vehicles. Because of the wide bandwidth available, mmWave communication may be particularly beneficial for transmitting and receiving large data sets. Example data that may be transmitted and received via mmWave communication include, among other things, (1) high definition 3D maps and (2) vehicle sensor information. This information may not be reasonable to be transmitted via conventional means (e.g., 3G, 4G, WiFi, Dedicated Short Range Communication (DSRC)) because transmission of the large amount of data via conventional means may either not be reasonably possible or may result in poor performance of the vehicle equipment. However, transmission of this information via mmWave communication can be routinely achieved and may not result in poor performance of our vehicle equipment.

Existing solutions such as "beam training by beam sweeping" are not suitable for vehicle applications because it is designed for low mobility environments. Vehicle applications frequently include high mobility environments. Thus, embodiments of a modification system are described herein that are capable of adaptively controlling a beamwidth setting for mmWave communications between a first endpoint and a second endpoint. For example, the modification system can be installed in an ego vehicle and adaptively determine a beamwidth setting for mmWave communications between the ego vehicle and a remote vehicle based on an estimated distance to the remote vehicle and an estimated position error for the estimated distance. The modification system is described in more detail below.

In some embodiments, a vehicle that includes the modification system is a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by the ADAS system of a modern vehicle require positioning information that describes the geographic position of the vehicle with lane-level accuracy. In addition, the current standard for DSRC requires that the geographic position of the vehicle be described with lane-level accuracy.

DSRC has a range of substantially 500 meters and is designed to be compatible for wirelessly sending and receiving messages among mobile nodes such as vehicles and Roadside Units ("RSU" if singular, "RSUs" if plural).

In some embodiments, devices other than vehicles (e.g., an endpoint that is not a vehicle) may be DSRC-equipped. These DSRC-equipped devices may be used to relay wireless vehicle data to the vehicle via a DSRC message. For example, an RSU or any other communication device may be DSRC-equipped if it includes one or more of the following elements: a DSRC transceiver and any software or hardware necessary to encode and transmit a DSRC message; and a DSRC receiver and any software or hardware necessary to receive and decode a DSRC message.

The embodiments described herein may use V2X communications to transmit and receive wireless messages. As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X wireless message) described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message, an LTE-V2N message, etc.); a 5G-V2X message; and a millimeter wave message, etc.

A BSM includes BSM data. The BSM data describes attributes of the vehicle that originally transmitted the BSM. The BSM data describes, among other things, one or more of the following: (1) the path history of the vehicle that transmits the BSM; (2) the speed of the vehicle that transmits the BSM; and (3) the GPS data describing a location of the vehicle that transmits the BSM.

In some embodiments, DSRC-equipped vehicles may probe other DSRC-equipped vehicles/devices along the roadway for information describing their current and future conditions, including their path history, future path, and sensor data they may have received or generated. This information is described as "DSRC probe data." DSRC probe data may include any data received via a DSRC probe or responsive to a DSRC probe.

A DSRC message may include DSRC-based data. The DSRC-based data may include BSM data or DSRC probe data. In some embodiments, the DSRC-based data included in a DSRC message may include BSM data or DSRC probe data received from a plurality of DSRC-equipped vehicles (or other DSRC-equipped devices or endpoints). This BSM data or DSRC probe data may include an identifier of its source and the location of the source or any traffic events described by the BSM data or DSRC probe data.

The BSM data or DSRC probe data may specify which lane a vehicle is traveling in as well as its speed of travel and path history. The BSM data or DSRC probe data may further specify one or more of the following: a velocity of the vehicle at one or more different times or one or more different locations; a heading of the vehicle at one or more different times or one or more different locations; and an acceleration of the vehicle at one or more different times or one or more different locations.

As used herein, the words "geographic location," "location," "geographic position" and "position" refer to a latitude and longitude of an object (or, a latitude, longitude, and elevation of an object) such as a connected vehicle. The example embodiments described herein provide positioning information that describes a geographic position of a vehicle with an accuracy of one or more of: (1) at least plus or minus 1.5 meters in relation to the actual geographic position of the vehicle in 2 dimensions including a latitude and a longitude; and (2) at least plus or minus 3 meters in relation to the actual geographic position of the vehicle in an elevation dimension. Accordingly, the example embodiments described herein are able to describe the geographic position of the vehicle with lane-level accuracy or better.

Example Overview

Referring to FIG. 1A, depicted is an operating environment 100 for a modification system 199 according to some embodiments. The operating environment 100 may include one or more of the following elements: a first endpoint 101; and a second endpoint 103. These elements of the operating environment 100 may be communicatively coupled to a network 105. Although not depicted in FIG. 1A, the operation environment 100 may include one or more RSUs that are DSRC-enabled. The one or more DSRC-enabled RSUs may relay wireless messages among the first endpoint 101 and the second endpoint 103 via the network 105. For example, the range of DSRC transmissions is generally about 500 meters, and so, if the second endpoint 103 is 700 meters away from the first endpoint 101, then one or more intervening DSRC-enabled RSUs may relay a DSRC message from the second endpoint 103 to the first endpoint 101 or from the first endpoint 101 to the second endpoint 103.

Although two endpoints and one network 105 are depicted in FIG. 1A, in practice the operating environment 100 may include any number of endpoints and any number of networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, 5G-V2X or any other mobile data network or combination of mobile data networks. Further, the network 105 may include one or more IEEE 802.11 wireless networks.

In some embodiments, the network 105 is a V2X network, which is a wireless network for sending and receiving V2X wireless messages among various endpoints (e.g., vehicles, roadside equipment, etc.) that each include a V2X radio. Each of the channels of the V2X radio may transmit and receive different types of V2X messages. For example, V2X channel #1 may transmit and receive mmWave messages, whereas V2X channel #2 may transmit and receive non-mmWave type V2X messages, such as one of the following: DSRC; LTE-V2X; 5G-V2X; ITS-G5 in Europe; ITS-Connect; or some other type of V2X communication that does not include mmWave. In some embodiments, each endpoint may include multiple V2X radios, including a first V2X radio used for transmitting and receiving non-mmWave messages and a second V2X radio used for transmitting and receiving mmWave messages.

Different non-mmWave types of V2X communication can be used in different countries. For example, if the modification system is implemented in the United States, then DSRC may be ideal for use as the non-mmWave type of V2X communication. If the modification system is implemented in Japan, then ITS-Connect may be ideal for use as the non-mmWave type of V2X communication. If the modification system is implemented in China, then LTE-V2X may be ideal for use as the non-mmWave type of V2X communication.

The first endpoint 101 and the second endpoint 103 can be any communication device in a roadway environment. For example, each of the first endpoint 101 and the second endpoint 103 can be a vehicle, a roadside unit, a base station, or any other infrastructure device. The first endpoint 101 and the second endpoint 103 may have a similar structure and provide similar functionality, and the description provided below for the first endpoint 101 may also be applicable to the second endpoint 103.

The first endpoint 101 may include one or more of the following elements: a processor 125; a memory 127; a communication unit 145; a GPS unit 170; a sensor set 182; an Advanced Driver-Assistance System (ADAS system) 183; an autonomous driving system 184; an onboard unit 185; and the modification system 199. These elements of the first endpoint 101 may be communicatively coupled to one another via a bus.

In some embodiments, the processor 125 and the memory 127 may be elements of an onboard vehicle computer system (such as computer system 200 described below with reference to FIG. 2). The onboard vehicle computer system may be operable to cause or control the operation of the modification system 199. The onboard vehicle computer system may be operable to access and execute the data stored on the memory 127 to provide the functionality described herein for the modification system 199 or its elements (see, e.g., FIG. 2).

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The first endpoint 101 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The first endpoint 101 may include one or more memories 127.

The memory 127 of the first endpoint 101 may store one or more of the following elements: first position data 129; first position accuracy data 131; second position data 133; second position accuracy data 135; distance data 137; position error data 139; and beamwidth setting data 140.

The first position data 129 includes digital data that describes a geographic location of the first endpoint 101 as determined by one or more onboard sensors of this particular endpoint. For example, the first position data 129 includes GPS data describing the geographic location of the first endpoint 101.

The first position accuracy data 131 includes digital data that describes an accuracy for the one or more onboard sensors of the first endpoint 101 that determine the first position data 129. For example, the first position accuracy data 131 indicates that the first position data 129 has a lane-level accuracy. In this way, a measurement error of the one or more onboard sensors of the first endpoint 101 may be accounted for by the modification system 199 of the first endpoint 101 when providing its functionality.

The second position data 133 includes digital data that describes a geographic location of the second endpoint 103 as determined by one or more onboard sensors of this particular endpoint. For example, the second position data 133 includes GPS data describing the geographic location of the second endpoint 103.

The second position accuracy data 135 includes digital data that describes an accuracy for the one or more onboard sensors of the second endpoint 103 that determine the second position data 133. For example, the second position accuracy data 135 indicates that the second position data 133 has a lane-level accuracy. In this way, a measurement error of the one or more onboard sensors of the second endpoint 103 may be accounted for by the modification system 199 of the first endpoint 101 when providing its functionality.

In some embodiments, the first endpoint 101 may receive the second position data 133 and the second position accuracy data 135 from the second endpoint 103 via a non-mmWave V2X wireless message.

The distance data 137 includes digital data describing a distance between the first endpoint 101 and the second endpoint 103. For example, the distance data 137 is calculated based on the first position data 129 and the second position data 133.

The position error data 139 includes digital data describing an estimated accuracy of the distance data 137. For example, the position error data 139 is calculated based on the first position accuracy data 131 and the second position accuracy data 135. In a further example, assume that the first position accuracy data 131 and the second position accuracy data 135 each have a lane-level accuracy (e.g., with a measurement deviation of +1.5 meters from an actual value). The position error data 139 then describes that the estimated distance described by the distance data 137 has a deviation of ±3 meters from the actual distance.

The beamwidth setting data 140 includes digital data describing a beamwidth setting for a V2X radio of the first endpoint 101 when exchanging mmWave V2X messages with the second endpoint 103. A beamwidth setting may describe, for example, a setting of a beamwidth for one or more beam lobes. The V2X radio of the first endpoint 101 performs a beam alignment for a mmWave communication with the second endpoint 103 based at least in part on the one or more beam lobes and selects the one or more beam lobes to exchange mmWave V2X messages with the second endpoint 103.

The communication unit 145 transmits and receives data to and from a network 105 or to another communication channel. In some embodiments, the communication unit 145 may include a DSRC transceiver, a DSRC receiver and other hardware or software necessary to make the first endpoint 101 a DSRC-enabled device. For example, the communication unit 145 includes a DSRC antenna configured to broadcast DSRC messages via the network. The DSRC antenna may also transmit BSM messages at a fixed interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection-Application interface EN 11253:2004 Dedicated Short-Range Communication-Physical layer using microwave at 5.8 GHz (review); EN 12795:2002 Dedicated Short-Range Communication (DSRC)-DSRC Data link layer: Medium Access and Logical Link Control (review); EN 12834:2002 Dedicated Short-Range Communication-Application layer (review); EN 13372:2004 Dedicated Short-Range Communication (DSRC)-DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The communication unit 145 includes a V2X radio 143. The V2X radio 143 is an electronic device that includes a V2X transmitter and a V2X receiver and is operable to send and receive wireless messages via any V2X protocol. For example, the V2X radio 143 is operable to send and receive wireless messages via DSRC. The V2X transmitter is operable to transmit and broadcast DSRC messages over the 5.9 GHz band. The V2X receiver is operable to receive DSRC messages over the 5.9 GHz band.

The V2X radio 143 includes multiple channels including an mmWave channel 141 and a non-mmWave type channel 142. The mmWave channel 141 is used for performing mmWave communications. The non-mmWave type channel 142 is used for performing non-mmWave type communications (e.g., DSRC communications or any other type of V2X communications that does not include mmWave).

In some embodiments, the communication unit 145 may include multiple V2X radios 143, including a first V2X radio 143 used for transmitting and receiving non-mmWave messages and a second V2X radio 143 used for transmitting and receiving mmWave messages.

In some embodiments, the GPS unit 170 is a conventional GPS unit of the first endpoint 101. For example, the GPS unit 170 may include hardware that wirelessly communicates with a GPS satellite to retrieve data that describes a geographic location of the first endpoint 101. For example, the GPS unit 170 retrieves GPS data describing the geographic location of the first endpoint 101 from one or more GPS satellites. In some embodiments, the GPS unit 170 is a DSRC-compliant GPS unit of the first endpoint 101 that is operable to provide GPS data describing the geographic location of the first endpoint 101 with lane-level accuracy.

The sensor set 182 includes one or more sensors that are operable to measure a roadway environment outside of the first endpoint 101. For example, the sensor set 182 may include one or more sensors that record one or more physical characteristics of the roadway environment that is proximate to the first endpoint 101. The memory 127 may store sensor data that describes the one or more physical characteristics recorded by the sensor set 182. The roadway environment outside of the first endpoint 101 may include the second endpoint 103, and so, one or more of the sensors of the sensor set 182 may record sensor data that describes information about the second endpoint 103.

In some embodiments, the sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, the sensors of the sensor set 182 are onboard sensors whose error rate is known. The sensors include range finding and position locating sensors such as LIDAR, radar, and GPS, as well as any other sensors that may be used to determine the distance and position data stored on the memory 127 and described herein (e.g., the first position data, the first position accuracy data, the second position data and the second position accuracy data).

The onboard unit 185 may be a computing device onboard on the first endpoint 101. For example, the onboard unit 185 includes an ECU. The ECU is an embedded system in automotive electronics that controls one or more of electrical systems or subsystems in the first endpoint 101. Types of the ECU include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the first endpoint 101 may include multiple onboard units 185 (e.g., multiple ECUs). In some embodiments, the modification system 199 may be an element of the onboard unit 185.

In some embodiments, the ADAS system 183 is a conventional ADAS system that controls operation of the first endpoint 101. In some embodiments, the ADAS system 183 may also include any software or hardware included in the first endpoint 101 that makes the first endpoint 101 an autonomous vehicle or a semi-autonomous vehicle.

Examples of the ADAS system 183 may include one or more of the following elements of the first endpoint 101: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In some embodiments, the autonomous driving system 184 may include any software or hardware included in the first endpoint 101 that makes the first endpoint 101 an autonomous vehicle. In some embodiments, the first endpoint 101 includes either the autonomous driving system 184 or the ADAS system 183. In some other embodiments, the first endpoint 101 includes both the autonomous driving system 184 and the ADAS system 183.

In some embodiments, the modification system 199 includes software that is operable, when executed by the processor 125, to cause the processor 125 to execute one or more steps of example processes 191, 192, 193, 500 and 550 and methods 300 and 400 described below with reference to FIGS. 1C and 3-5B.

In some embodiments, the modification system 199 may be implemented using hardware including a field-programmable gate array ("FPGA") or an application-specific integrated circuit ("ASIC"). In some other embodiments, the modification system 199 may be implemented using a combination of hardware and software. The modification system 199 may be stored in a combination of the devices (e.g., servers or other devices), or in one of the devices.

The modification system 199 is described in more detail below with reference to FIGS. 1C-6.

Figure 1B:
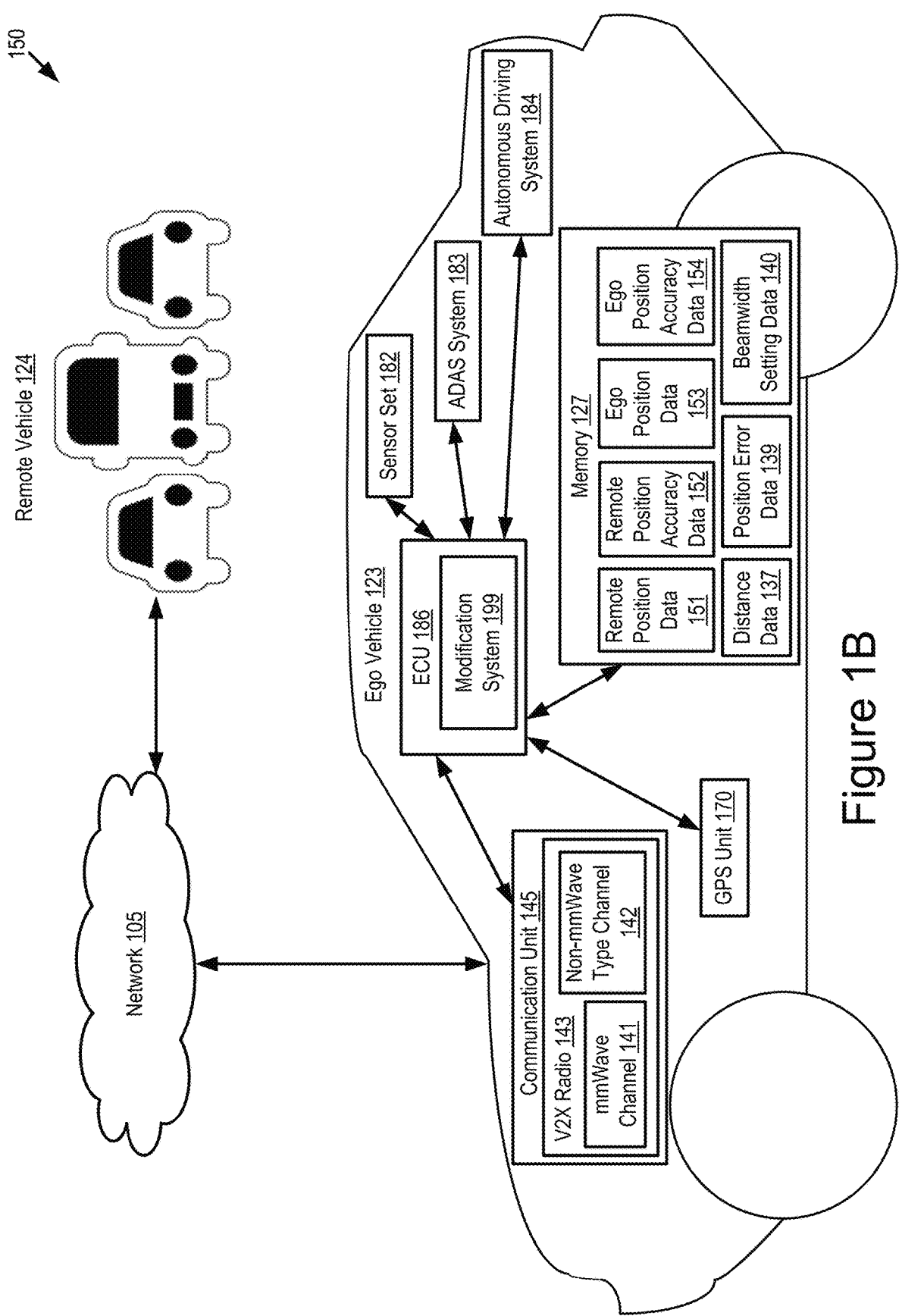
FIG. 1B is another block diagram illustrating an operating environment for a modification system according to some embodiments.

Referring to FIG. 1B, depicted is another operating environment 150 for the modification system 199 according to some embodiments. The operating environment 150 may include one or more of the following elements: an ego vehicle 123; and one or more remote vehicles 124. These elements of the operating environment 150 may be communicatively coupled to the network 105.

Although one ego vehicle 123, three remote vehicles 124 and one network 105 are depicted in FIG. 1B, in practice the operating environment 150 may include one or more ego vehicles 123, one or more remote vehicles 124 and one or more networks 105.

In some embodiments, the ego vehicle 123 may be an example of the first endpoint 101 and a remote vehicle 124 may be an example of the second endpoint 103. Thus, description provided herein for the first endpoint 101 and the second endpoint 103 may also be applicable to the ego vehicle 123 and the remote vehicle 124. Similar description is not repeated here.

In some embodiments, the ego vehicle 123 and the remote vehicle 124 may have a similar structure, and the description provided below for the ego vehicle 123 may also be applicable to the remote vehicle 124.

In some embodiments, at least one remote vehicle 124 is a connected vehicle like the ego vehicle 123. In some embodiments, at least one remote vehicle 124 is an unconnected vehicle. The remote vehicle 124 includes elements that are similar to those of the ego vehicle 123 including, for example, the sensors and the V2X radio. In some embodiments, the remote vehicle 124 includes its own instance of the modification system 199.

In some embodiments, one or more of the ego vehicle 123 and the remote vehicle 124 may be DSRC-equipped devices. The network 105 may include one or more communication channels shared among the ego vehicle 123, the remote vehicle 124 and one or more RSUs. The one or more communication channels may include DSRC, LTE-V2X, full-duplex wireless communication or any other wireless communication protocol. For example, the network 105 may be used to transmit a DSRC message, DSRC probe or BSM including any of the data described herein.

The ego vehicle 123 may be any type of vehicle. For example, the ego vehicle 123 may include one of the following types of vehicles: a car; a truck; a sports utility vehicle; a bus; a semi-truck; a drone or any other roadway-based conveyance.

In some embodiments, the ego vehicle 123 may include an autonomous vehicle or a semi-autonomous vehicle. For example, the ego vehicle 123 may include an Advanced Driver-Assistance System (e.g., the ADAS system 183). The ADAS system 183 may provide some or all of the functionality that provides autonomous functionality.

The ego vehicle 123 may include one or more of the following elements: the processor 125; the memory 127; the communication unit 145; the GPS unit 170; the sensor set 182; an ECU 186; the ADAS system 183; the autonomous driving system 184; and the modification system 199. These elements of the ego vehicle 123 may be communicatively coupled to one another via a bus. These elements of the ego vehicle 123 are described above with reference to FIG. 1A, and similar description is not repeated here.

In some embodiments, the memory 127 of the ego vehicle 123 stores one or more of: remote position data 151; remote position accuracy data 152; ego position data 153; ego position accuracy data 154; the distance data 137; the position error data 139; and the beamwidth setting data 140.

The remote position data 151 includes digital data that describes a geographic location of the remote vehicle 124 as determined by one or more onboard sensors of the remote vehicle 124. For example, the remote position data 151 includes GPS data describing the geographic location of the remote vehicle 124. The remote position data 151 can be an example of the second position data 133.

The remote position accuracy data 152 includes digital data that describes an accuracy for the one or more onboard sensors of the remote vehicle 124 that determine the remote position data 151. For example, the remote position accuracy data 152 indicates that the remote position data 151 has a lane-level accuracy. In this way, a measurement error of the one or more onboard sensors of the remote vehicle 124 may be accounted for by the modification system 199 of the ego vehicle 123 when providing its functionality. The remote position accuracy data 152 can be an example of the second position accuracy data 135.

The ego position data 153 includes digital data that describes a geographic location of the ego vehicle 123 as determined by one or more onboard sensors of the ego vehicle 123. For example, the ego position data 153 includes GPS data describing the geographic location of the ego vehicle 123. The ego position data 153 can be an example of the first position data 129.

The ego position accuracy data 154 includes digital data that describes an accuracy for the one or more onboard sensors that determine the ego position data 153. For example, the ego position accuracy data 154 indicates that the ego position data 153 has a lane-level accuracy. In this way, a measurement error of the one or more onboard sensors of the ego vehicle 123 may be accounted for by the modification system 199 of the ego vehicle 123 when providing its functionality. The ego position accuracy data 154 can be an example of the first position accuracy data 131.

The distance data 137 includes digital data describing, for example, a distance between the ego vehicle 123 and the remote vehicle 124. For example, the distance data 137 is calculated based on the ego position data 153 and the remote position data 151.

The position error data 139 includes digital data describing an estimated accuracy of the distance data 137. For example, the position error data 139 is calculated based on the ego position accuracy data 154 and the remote position accuracy data 152. In another example, assume that the ego position accuracy data 154 and the remote position accuracy data 152 each have a lane-level accuracy (e.g., with a deviation of ±1.5 meters). Then, the position error data 139 describes that an estimated accuracy for the estimated distance described by the distance data 137 has a deviation of ±3 meters form the actual distance. In yet another example, assume that the ego position accuracy data 154 has a lane-level accuracy (e.g., with a deviation of ±1.5 meters from the actual position of the ego vehicle 123) and the remote position accuracy data 151 has an accuracy of a deviation of ±10 meters from the actual position of the remote vehicle 124. The position error data 139 then describes that an estimated accuracy of the distance data 137 has a deviation of ±11.5 meters from the actual distance.

The beamwidth setting data 140 includes digital data describing, for example, a beamwidth setting for the V2X radio 143 of the ego vehicle 123 when exchanging mmWave V2X messages with the remote vehicle 124.

Figure 1C:
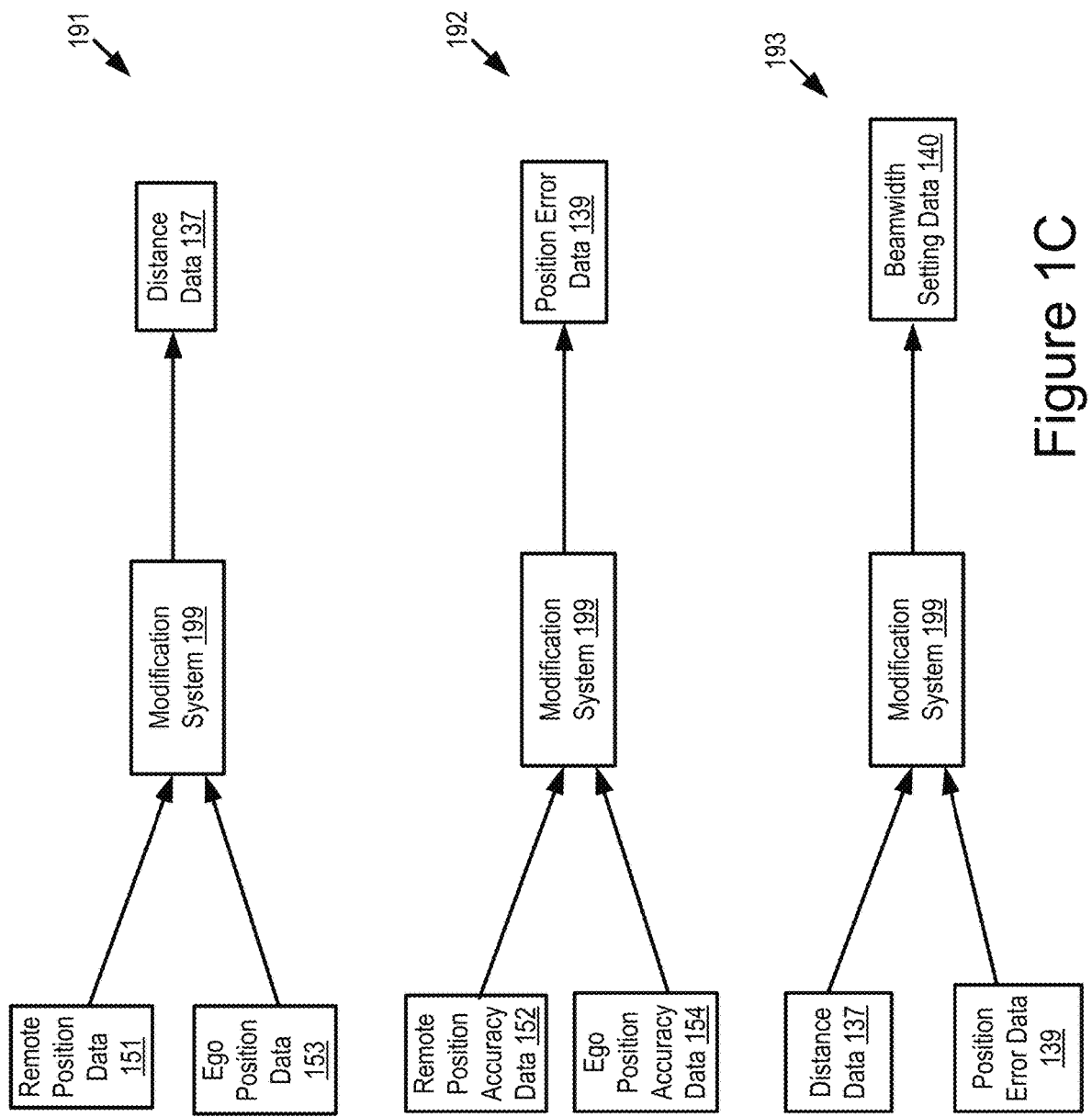
FIG. 1C depicts example processes executed by a modification system according to some embodiments.

Referring to FIG. 1C, example processes 191, 192 and 193 executed by the modification system 199 are depicted according to some embodiments. In the example process 191, the modification system 199 uses the remote position data 151 describing the geographic location of the remote vehicle 124 and the ego position data 153 describing the geographic location of the ego vehicle 123 as inputs, and generates the distance data 137 describing a distance between the remote vehicle 124 and the ego vehicle 123 as an output.

In the example process 192, the modification system 199 uses the remote position accuracy data 152 and the ego position accuracy data 154 as inputs and generates the position error data 139 as an output.

In the example process 193, the modification system 199 uses the distance data 137 generated in the process 191 and the position error data 139 generated in the process 192 as inputs and determines the beamwidth setting data 140 describing a beamwidth setting for the V2X radio 143 based on the distance data 137 and the position error data 139.

Example Computer System

Figure 2:
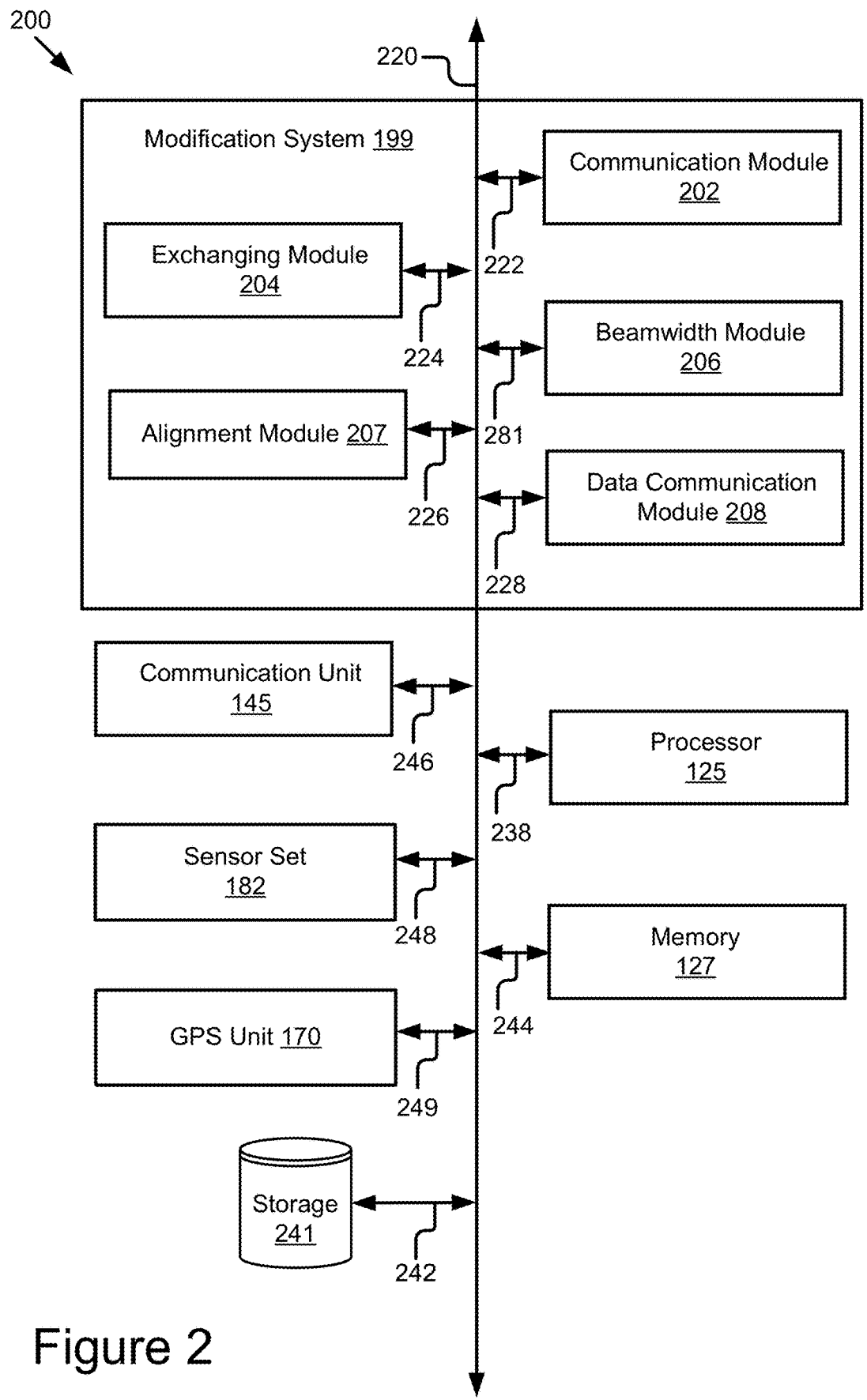
FIG. 2 is a block diagram illustrating an example computer system including a modification system according to some embodiments.

Referring now to FIG. 2, depicted is a block diagram illustrating an example computer system 200 including the modification system 199 according to some embodiments. In some embodiments, the computer system 200 may include a special-purpose computer system that is programmed to perform one or more steps of methods 300 and 400 described below with reference to FIGS. 3-4 and processes 500 and 550 described below with reference to FIGS. 5A-5B.

In some embodiments, the computer system 200 may be an element of the first endpoint 101. In some embodiments, the computer system 200 may be an onboard vehicle computer of the first endpoint 101. In some embodiments, the computer system 200 may include an engine control unit, head unit or some other processor-based computing device of the first endpoint 101.

The computer system 200 may include one or more of the following elements according to some examples: the modification system 199; the processor 125; the communication unit 145; the sensor set 182; the GPS unit 170; the memory 127; and a storage 241. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 246. The sensor set 182 is communicatively coupled to the bus 220 via a signal line 248. The GPS unit 170 is communicatively coupled to the bus 220 via a signal line 249. The storage 241 is communicatively coupled to the bus 220 via a signal line 242. The memory 127 is communicatively coupled to the bus 220 via a signal line 244.

The following elements of the computer system 200 are described above with reference to FIGS. 1A-1B, and so, those descriptions will not be repeated here: the processor 125; the communication unit 145; the sensor set 182; the GPS unit 170; and the memory 127.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the modification system 199 includes: a communication module 202; an exchanging module 204; a beamwidth module 206; an alignment module 207; and a data communication module 208. These components of the modification system 199 are communicatively coupled to each other via the bus 220. In some embodiments, components of the modification system 199 can be stored in a single server or device. In some other embodiments, components of the modification system 199 can be distributed and stored across multiple servers or devices. For example, some of the components of the modification system 199 may be distributed across the second endpoint 103 and the first endpoint 101.

The communication module 202 can be software including routines for handling communications between the modification system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100 or 150. For example, the communication module 202 receives or transmits, via the communication unit 145, a V2X wireless message. The communication module 202 may send or receive any of the data or messages described above with reference to FIGS. 1A-1C via the communication unit 145.

In some embodiments, the communication module 202 receives data from components of the modification system 199 and stores the data in one or more of the storage 241 and the memory 127. For example, the communication module 202 receives any of the data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the modification system 199. For example, the communication module 202 may handle communications among the exchanging module 204, the beamwidth module 206, the alignment module 207 and the data communication module 208. Any of these modules may cause the communication module 202 to communicate with the other elements of the computer system 200 or the operating environment 100 or 150 (via the communication unit 145). For example, the exchanging module 204 may use the communication module 202 to communicate with the sensor set 182 and cause the sensor set 182 to record sensor data.

In some embodiments, the communication module 202 receives a V2X wireless message from the network 105, and the V2X wireless message includes the second position data and the second position accuracy data generated by the second endpoint 103. For example, the V2X wireless message is selected from a group that consists of: a DSRC message; a BSM; a LTE message; a LTE-V2X wireless message; a 5G-V2X message; and any other non-mmWave type message, etc. The communication module 202 retrieves the second position data and the second position accuracy data from the V2X wireless message and sends the second position data and the second position accuracy data to the exchanging module 204.

The exchanging module 204 can be software including routines for exchanging position data and position accuracy data with the second endpoint 103. In some embodiments, the exchanging module 204 can be stored in the memory 127 of the computer system 200 and can be accessible and executable by the processor 125. The exchanging module 204 may be adapted for cooperation and communication with the processor 125 and other components of the computer system 200 via a signal line 224.

In some embodiments, the exchanging module 204 may operate one or more sensors of the sensor set 182 to generate sensor data describing the measurements of the sensor set 182. The exchanging module 204 may cause the sensor data to be stored in the memory 127. Specifically, the exchanging module 204 may operate one or more sensors included in the sensor set 182 to record sensor data describing measurements of a physical environment proximate to the computer system 200. The second endpoint 103 may be located in the physical environment proximate to the first endpoint 101 that includes the computer system 200.

In some embodiments, the exchanging module 204 may cause the GPS unit 170 to retrieve positional information for the computer system 200. For example, the computer system 200 is an element of the first endpoint 101 and the exchanging module 204 may cause the GPS unit 170 to retrieve first position data (e.g., GPS data) describing the geographic location of the first endpoint 101.

In some embodiments, the exchanging module 204 determines the first position accuracy data associated with the first position data. For example, the exchanging module 204 determines the first position accuracy data indicating that the first position data has a lane-level accuracy.

In some embodiments, the exchanging module 204 exchanges position data and position accuracy data with the second endpoint 103 via the non-mmWave type channel 142 of the V2X radio 143. The position data includes (1) the first position data describing a position of the first endpoint 101 and (2) second position data describing a position of the second endpoint 103, and the position accuracy data includes (1) the first position accuracy data describing an accuracy of the first position data and (2) second position accuracy data describing an accuracy of the second position data. For example, the exchanging module 204 transmits the first position data and the first position accuracy data to the second endpoint 103 via the non-mmWave type channel 142 and receives the second position data and the second position accuracy data from the second endpoint 103 via the non-mmWave type channel.

The exchanging module 204 sends the position data (e.g., the first position data and the second position data) and the position accuracy data (e.g., the first position accuracy data and the second position accuracy data) to the beamwidth module 206.

The beamwidth module 206 can be software including routines that, when executed by the processor 125, cause the processor 125 to determine a beamwidth setting for executing a beam alignment for the mmWave channel 141 of the V2X radio 143. In some embodiments, the beamwidth module 206 can be a set of instructions stored in the memory 127 of the computer system 200 and can be accessible and executable by the processor 125. The beamwidth module 206 may be adapted for cooperation and communication with the processor 125 and other components of the computer system 200 via a signal line 281.

In some embodiments, the beamwidth module 206 is operable to adjust a beamwidth setting for the mmWave channel 141 of the V2X radio 143 based on the position data and the position accuracy data. Specifically, based on the position data and the position accuracy data, the beamwidth module 206 determines (1) an estimated distance between the first endpoint 101 and the second endpoint 103 and (2) an estimated position error for the estimated distance. For example, the beamwidth module 206 determines the estimated distance between the first endpoint 101 and the second endpoint 103 based on the first position data and the second position data and determines the estimated position error for the estimated distance based on the first position accuracy data and the second position accuracy data. Then, the beamwidth module 206 determines the beamwidth setting for the mmWave channel 141 of the V2X radio 143 based on the estimated distance and the estimated position error.

Figure 6:
FIG. 6 is a graphical representation illustrating a comparison between a first beamwidth setting and a second beamwidth setting according to some embodiments.

A beamwidth selection has an impact on mmWave V2X communications as illustrated in FIG. 6. Turning to FIG. 6, a comparison 600 between a first beamwidth setting (e.g., beam lobes with a wider beamwidth) and a second beamwidth setting (beam lobes with a narrower beamwidth) is provided according to some embodiments. Depending on a setting of the beamwidth, there is a trade-off between a communication range, beam alignment errors and beam alignment overhead for mmWave V2X communications. Here, the beam alignment overhead may refer to one or more of an amount of resources and an amount of time needed to perform a beam alignment.

With respect to the communication range, a first mmWave V2X communication with a wider beamwidth has a lower beamforming gain, which leads to a lower signal-to-noise ratio (SNR). Thus, the first mmWave V2X communication with the wider beamwidth has a shorter communication range. On the other hand, a second mmWave V2X communication with a narrower beamwidth has a higher beamforming gain, which leads to a higher SNR. Thus, the second mmWave V2X communication with the narrower beamwidth has a longer communication range.

With respect to the impact on beam alignment errors, the first mmWave V2X communication with the wider beamwidth has a wider angular coverage, and thus, the first mmWave V2X communication with the wider beamwidth has lower beam alignment errors. On the other hand, the second mmWave V2X communication with the narrower beamwidth has a narrower angular coverage, and thus, the second mmWave V2X communication with the narrower beamwidth has higher beam alignment errors.

With respect to the beam alignment overhead, the first mmWave V2X communication with the wider beamwidth has less beam lobe candidates, and thus, the first mmWave V2X communication with the wider beamwidth has lower beam alignment overhead. On the other hand, the second mmWave V2X communication with the narrower beamwidth has more beam lobe candidates, and thus, the second mmWave V2X communication with the narrower beamwidth has higher beam alignment overhead. For example, execution of a beam alignment for the first mmWave V2X communication with the wider beamwidth may need less resources and less time than that of the second mmWave V2X communication.

Turning back to FIG. 2, the beamwidth module 206 determines the beamwidth setting for the mmWave channel 141 of the V2X radio 143 based on the estimated distance and the estimated position error. In some embodiments, the beamwidth module 206 selects a beamwidth based on the estimated distance and the estimated position error and notifies the alignment module 207 of the beamwidth so that the alignment module 207 can determine beam lobe candidates for a beam alignment based on the beamwidth. For example, for a greater estimated distance, the beamwidth module 206 may select a narrower beamwidth so that a communication range requirement (or correspondingly a SNR requirement) is met during an mmWave communication. In another example, for a smaller estimated distance, the beamwidth module 206 may select a wider beamwidth so that beam alignment errors and beam alignment overhead can be reduced while a communication range requirement (or correspondingly a SNR requirement) is also met during an mmWave communication.

Here, by way of example, the SNR requirement may indicate that a signal transmitted via the mmWave communication from a transmitter to a receiver (e.g., from the first endpoint 101 to the second endpoint 103 or vice versa) needs to satisfy an SNR threshold when received at the receiver. The communication range requirement may indicate that a signal transmitted from a transmitter needs to satisfy one or more of an SNR threshold and a received signal strength threshold after propagating through a certain communication range.

The beamwidth module 206 may take the estimated position error into consideration when determining the beamwidth. For example, assume that the estimated position error is ±3 meters. The determined beamwidth is feasible for the estimated distance with a deviation of ±3 meters.

In some embodiments, the beamwidth module 206 receives V2X feedback data from the second endpoint 103 via one or more of the non-mmWave type channel 142 and the mmWave channel 141 and adjusts the beamwidth setting for the mmWave channel 141 of the V2X radio 143 further based on the V2X feedback data. For example, the V2X feedback data may describe one or more of: (1) mmWave feedback about the mmWave communication between the first endpoint 101 and the second endpoint 103; (2) route data describing a planned route of the second endpoint 103; (3) heading data describing a heading of the second endpoint 103; and (4) speed data describing a speed of the second endpoint 103, etc. The beamwidth module 206 determines the beamwidth setting for the mmWave channel 141 of the V2X radio 143 further based on one or more of the mmWave feedback, the route data, the heading data, and the speed data.

The alignment module 207 can be software including routines that, when executed by the processor 125, cause the processor 125 to perform a beam alignment with the second endpoint 103 using the V2X radio 143. In some embodiments, the alignment module 207 can be stored in the memory 127 of the computer system 200 and can be accessible and executable by the processor 125. The alignment module 207 may be adapted for cooperation and communication with the processor 125 and other components of the computer system 200 via a signal line 226.

In some embodiments, the alignment module 207 receives data describing the beamwidth setting (e.g., data describing a beamwidth) from the beamwidth module 206. The alignment module 207 performs a beam alignment for the mmWave channel 141 of the V2X radio 143 based on the beamwidth setting to modify an operation of the V2X radio 143 so that the V2X radio 143 exchanges a mmWave communication with the second endpoint 103 using the beam alignment indicated by the beamwidth setting. For example, the alignment module 207 sweeps a beam of the V2X radio 143 to align the beam of the V2X radio 143 with the second endpoint 103 so that one or more beam lobes with a beamwidth determined by the beamwidth setting are selected for the mmWave communication.

For example, the alignment module 207 determines a set of beam lobe candidates based on the beamwidth described by the beamwidth setting (e.g., for a beamwidth of 60 degrees and a beam-sweeping coverage of 180 degrees, the alignment module 207 may determine 180°/60°=3 beam lobe candidates; for a beamwidth of 30 degrees, the alignment module 207 may determine 180°/30°=6 beam lobe candidates). The alignment module 207 then performs the beam alignment based on the set of beam lobe candidates (e.g., the alignment module 207 modifies an operation of the V2X radio 143 so that the V2X radio 143 performs the beam alignment with the second endpoint 103 based on the set of beam lobe candidates). Then, the alignment module 207 selects one or more beam lobes from the set of beam lobe candidates for the mmWave communication (e.g., one or more beam lobes pointing to a direction of the second endpoint 103 are selected for the V2X radio 143 of the first endpoint 101 so that the V2X radio 143 of the first endpoint 101 performs the mmWave communication with the second endpoint 103 using the one or more beam lobes).

In another example, for a beam-lobe pointing direction from the first endpoint 101 to the second endpoint 103, the alignment module 207 determines a set of beam lobe candidates with various beamwidths (e.g., each beam lobe candidate has a beam lobe pointing direction from the first endpoint 101 to the second endpoint 103 but with a different beamwidth). The alignment module 207 selects a beam lobe from the set of beam lobe candidates based on the beamwidth setting for the mmWave communication. For example, the alignment module 207 selects a beam lobe with a beamwidth described by the beamwidth setting. A further example of the beam lobe selection is described below with reference to FIG. 5B.

In some embodiments, the one or more beam lobes are selected at the first endpoint 101 such that the beamwidth is maximized while a SNR requirement is also met during the mmWave communication. In some embodiments, the beamwidth setting provides an improved mmWave communication performance for the V2X radio 143 that includes one or more of: a reduction of beam alignment errors (e.g., more robust to beam alignment errors); and a reduction of beam alignment overhead.

The data communication module 208 can be software including routines that, when executed by the processor 125, cause the processor 125 to perform a mmWave communication with the second endpoint 103 using the V2X radio 143. In some embodiments, the data communication module 208 can be stored in the memory 127 of the computer system 200 and can be accessible and executable by the processor 125. The data communication module 208 may be adapted for cooperation and communication with the processor 125 and other components of the computer system 200 via a signal line 228.

In some embodiments, responsive to a completion of the beam alignment performed by the alignment module 207, the data communication module 208 performs a mmWave communication with the second endpoint 103 using the one or more beam lobes selected during the beam alignment. For example, responsive to a completion of the beam alignment, the data communication module 208 modifies an operation of the V2X radio 143 so that the V2X radio 143 exchanges a mmWave communication with the second endpoint 103 using the one or more beam lobes with a beamwidth indicated by the beamwidth setting.

In the above description, FIG. 2 is described with reference to the first endpoint 101. It should be understood that similar operations can also be performed by the second endpoint 103. Similar description is not repeated here.

Example Processes

Figure 3:
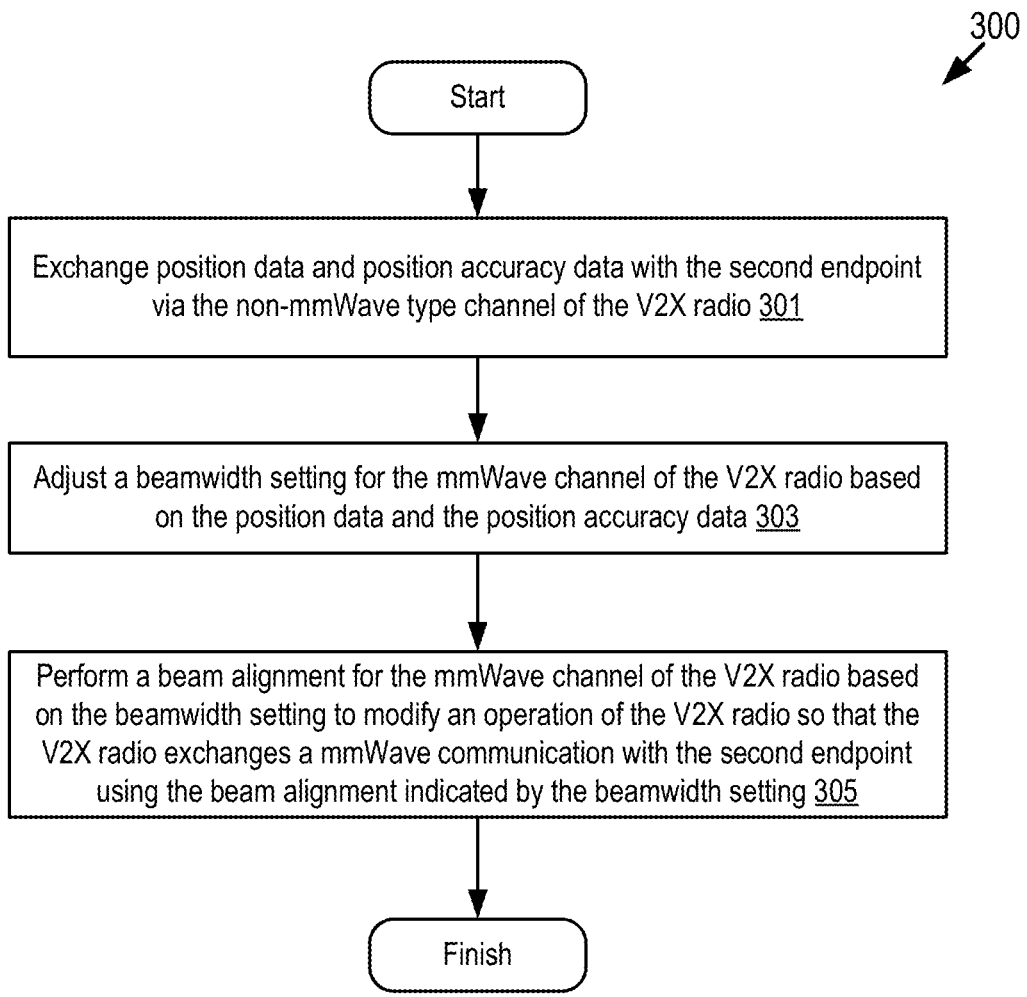
FIG. 3 depicts a method for adaptively controlling a beamwidth setting for a mmWave communication between a first endpoint and a second endpoint according to some embodiments.

Referring now to FIG. 3, depicted is a flowchart of an example method 300 for adaptively controlling a beamwidth setting for a mmWave communication between the first endpoint 101 and the second endpoint 103 according to some embodiments. The steps of the method 300 are executable in any order, and not necessarily the order depicted in FIG. 3. The method 300 may be executed by the first endpoint 101.

At step 301, the exchanging module 204 of the first endpoint 101 exchanges position data and position accuracy data with the second endpoint 103 via the non-mmWave type channel 142 of the V2X radio 143.

At step 303, the beamwidth module 206 adjusts a beamwidth setting for the mmWave channel 141 of the V2X radio 143 based on the position data and the position accuracy data.

At step 305, the alignment module 207 performs a beam alignment for the mmWave channel 141 of the V2X radio 143 based on the beamwidth setting to modify an operation of the V2X radio 143 so that the V2X radio 143 exchanges a mmWave communication with the second endpoint 103 using the beam alignment indicated by the beamwidth setting.

Figure 4:
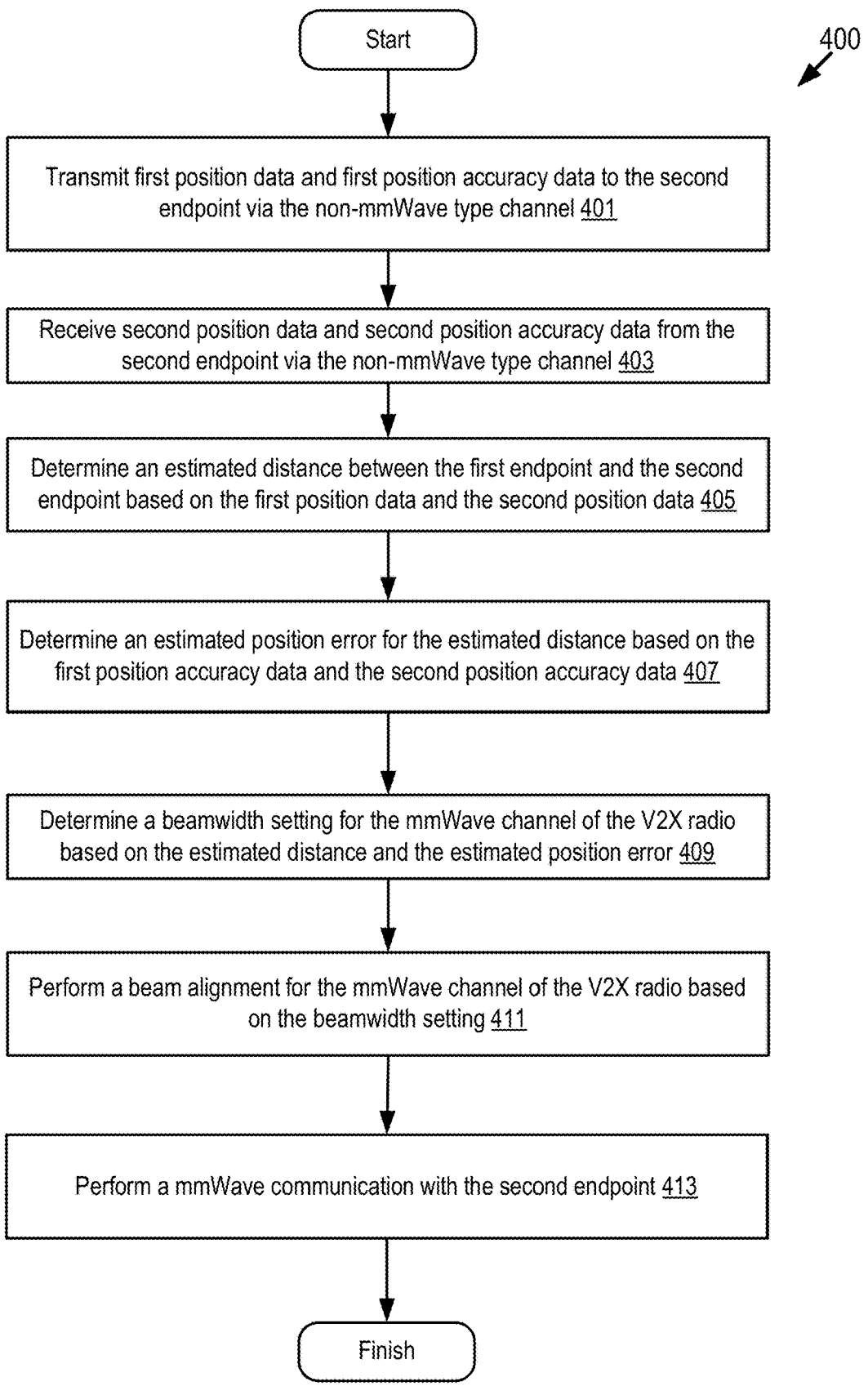
FIG. 4 depicts another method for adaptively controlling a beamwidth setting for a mmWave communication between a first endpoint and a second endpoint according to some embodiments.

FIG. 4 depicts another method 400 for adaptively controlling a beamwidth setting for a mmWave communication between the first endpoint 101 and the second endpoint 103 according to some embodiments. The steps of the method 400 are executable in any order, and not necessarily the order depicted in FIG. 4. The method 400 may be executed by the first endpoint 101.

At step 401, the exchanging module 204 transmits first position data and first position accuracy data to the second endpoint 103 via the non-mmWave type channel 142.

At step 403, the exchanging module 204 receives second position data and second position accuracy data from the second endpoint 103 via the non-mmWave type channel 142.

At step 405, the beamwidth module 206 determines an estimated distance between the first endpoint 101 and the second endpoint 103 based on the first position data and the second position data.

At step 407, the beamwidth module 206 determines an estimated position error for the estimated distance based on the first position accuracy data and the second position accuracy data.

At step 409, the beamwidth module 206 determines a beamwidth setting for the mmWave channel 141 of the V2X radio 143 based on the estimated distance and the estimated position error.

At step 411, the alignment module 207 performs a beam alignment for the mmWave channel 141 of the V2X radio 143 based on the beamwidth setting.

At step 413, the data communication module 208 performs a mmWave communication with the second endpoint 103 using one or more beam lobes selected during the beam alignment.

In the above description, FIGS. 3-4 are described with reference to the first endpoint 101. It should be understood that similar operations can also be performed by the second endpoint 103. Similar description is not repeated here.

Figure 5A:
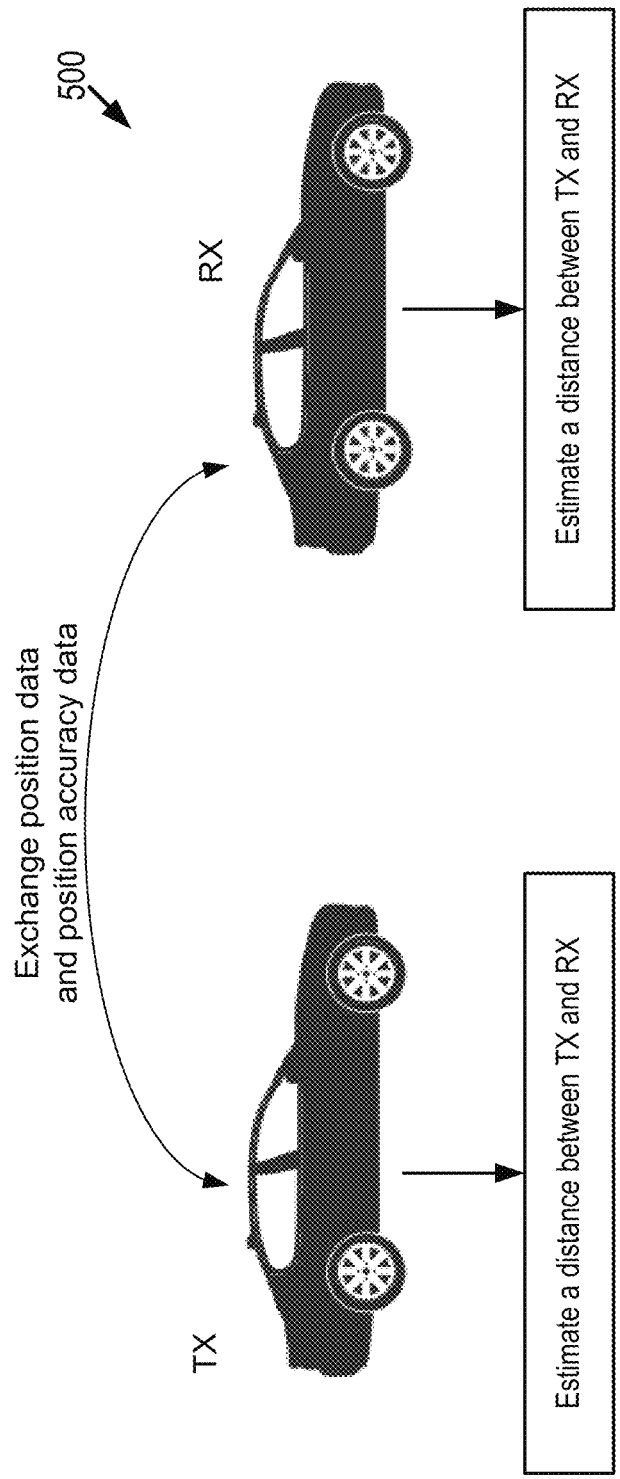
FIGS. 5A-5B are graphical representations illustrating adaptive beamwidth control for a mmWave communication between a first endpoint and a second endpoint according to some embodiments.

Referring to FIG. 5A, illustrated is an example process 500 for determining an estimated distance between a transmitter (TX) and a receiver (RX) according to some embodiments. Here, the transmitter can be the first endpoint 101 and the receiver can be the second endpoint 103. Alternatively, the receiver can be the first endpoint 101 and the transmitter can be the second endpoint 103. For example, each of the transmitter and the receiver can be a vehicle, a RSU or a base station. Each of the transmitter and the receiver has both a mmWave radio and a lower-frequency radio (e.g., 802.11p, LTE-V2X, 5G-V2X, etc.), where the lower-frequency radio can be used to exchange position information of the transmitter and the receiver periodically (e.g., once every 100 millisecond).

In some embodiments, the transmitter and the receiver exchange position data and position accuracy data with one another via the lower-frequency radio. For example, the transmitter sends first position data describing a position of the transmitter and first position accuracy data describing an accuracy of the first position data to the receiver. The receiver sends second position data describing a position of the receiver and second position accuracy data describing an accuracy of the second position data to the transmitter.

The transmitter and the receiver respectively estimate a distance between the transmitter and the receiver based on the first position data and the second position data, and respectively estimate position error data for the estimated distance based on the first position accuracy data and the second position accuracy data.

Figure 5B:
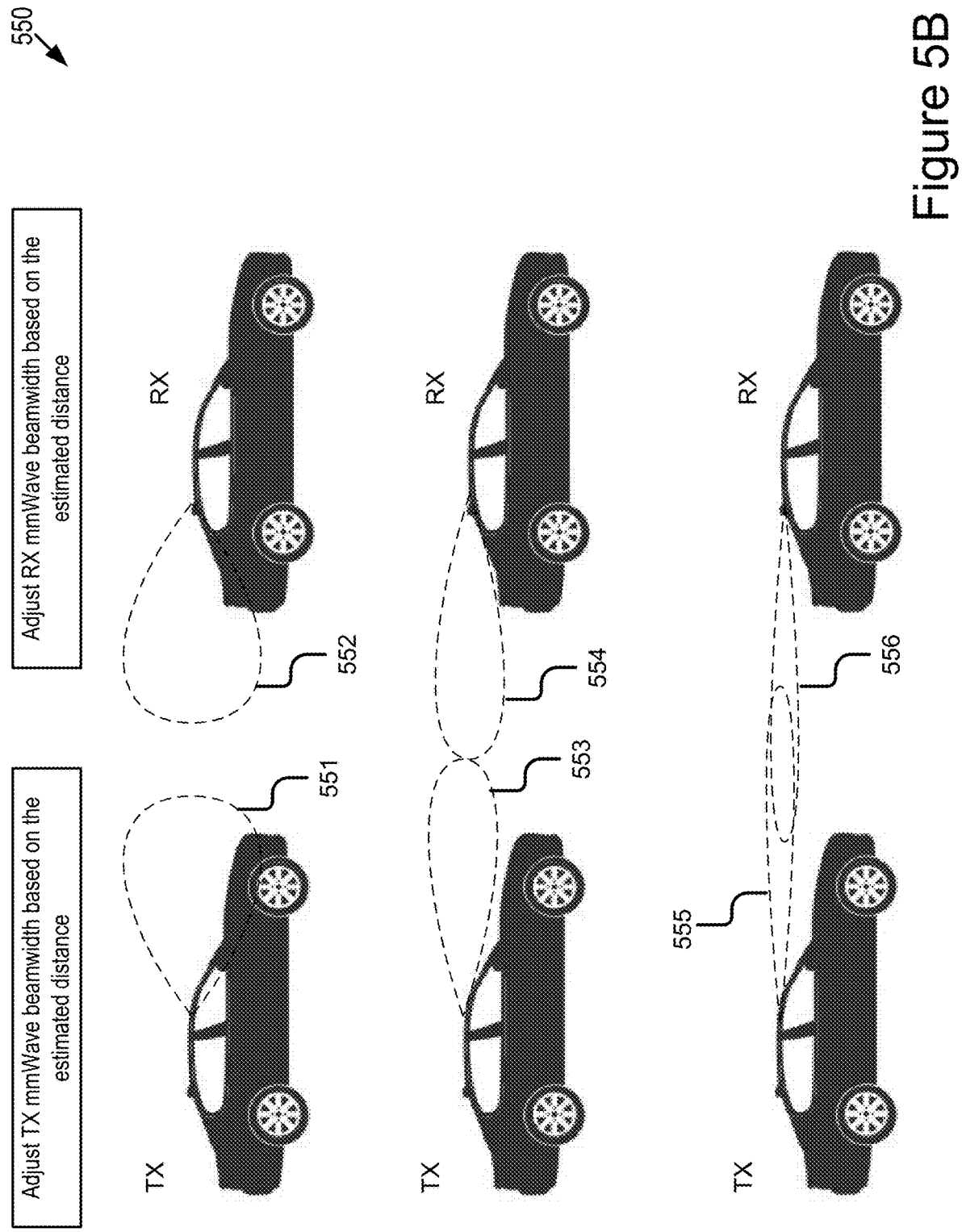

Referring to FIG. 5B, illustrated is an example process 550 for adaptively controlling a beamwidth setting between the transmitter and the receiver of FIG. 5A according to some embodiments. The transmitter and the receiver respectively adjust a beamwidth for a mmWave beam alignment based on the estimated distance and the estimated position error data so that the beamwidth is maximized while ensuring a communication range requirement (or an SNR requirement) is satisfied. For example, the transmitter adjusts a TX mmWave beamwidth based on the estimated distance and the estimated position error data. Similarly, the receiver adjusts a RX mmWave beamwidth based on the estimated distance and the estimated position error data.

For example, with a beam-lobe pointing direction from the transmitter to the receiver or from the receiver to the transmitter, the transmitter may have a first beam lobe candidate 551 and the receiver may have a second beam lobe candidate 552, where the first beam lobe candidate 551 and the second beam lobe candidate 552 each have a first beamwidth and a first communication range. Also, the transmitter may have a third beam lobe candidate 553 and the receiver may have a fourth beam lobe candidate 554, where the third beam lobe candidate 553 and the fourth beam lobe candidate 554 each have a second beamwidth and a second communication range. Furthermore, the transmitter may have a fifth beam lobe candidate 555 and the receiver may have a sixth beam lobe candidate 556, where the fifth beam lobe candidate 555 and the sixth beam lobe candidate 556 each have a third beamwidth and a third communication range.

Based on the estimated distance and the estimated position error data, the modification system 199 determines that: (1) the first beam lobe candidate 551 and the second beam lobe candidate 552 have the maximal beamwidth but do not satisfy the communication range requirement (or the SNR requirement, or both); (2) the third beam lobe candidate 553 and the fourth beam lobe candidate 554 have the second largest beamwidth and satisfy the communication range requirement (or the SNR requirement); and (3) the fifth beam lobe candidate 555 and the sixth beam lobe candidate 556 have the smallest beamwidth and satisfy the communication range requirement (or the SNR requirement). In order to maximize the beamwidth while ensuring a satisfaction of the communication range requirement (or the SNR requirement), the third beam lobe candidate 553 and the fourth beam lobe candidate 554 are selected as a TX mmWave beam lobe and a RX mmWave beam lobe for the mmWave communication between the transmitter and the receiver respectively. Then, the mmWave communication is executed using the TX mmWave beam lobe and the RX mmWave beam lobe.

FIG. 6 is a graphical representation illustrating a comparison 600 between a first beamwidth setting and a second beamwidth setting according to some embodiments. FIG. 6 is described above, and similar description is not repeated here.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for a first endpoint, comprising:
   exchanging position data and position accuracy data with a second endpoint via a non-millimeter wave (non-mmWave) type channel of a vehicle-to-everything (V2X) radio;
   adjusting a beamwidth setting for a millimeter wave (mmWave) channel of the V2X radio based on the position data and the position accuracy data; and
   performing a beam alignment for the mmWave channel of the V2X radio based on the beamwidth setting to modify an operation of the V2X radio so that the V2X radio exchanges a mmWave communication with the second endpoint using the beam alignment indicated by the beamwidth setting;
   wherein the beamwidth setting provides an improved mmWave communication performance for the V2X radio that includes one or more of a reduction of beam alignment errors and a reduction of beam alignment overhead.

2. The method of claim 1, wherein adjusting the beamwidth setting for the mmWave channel of the V2X radio based on the position data and the position accuracy data comprises:
   determining, based on the position data and the position accuracy data, an estimated distance between the first endpoint and the second endpoint and an estimated position error for the estimated distance; and
   determining the beamwidth setting for the mmWave channel of the V2X radio based on the estimated distance and the estimated position error.

3. The method of claim 2, wherein the position data includes first position data describing a position of the first endpoint and second position data describing a position of the second endpoint, and the position accuracy data includes first position accuracy data describing an accuracy of the first position data and second position accuracy data describing an accuracy of the second position data.

4. The method of claim 3, wherein determining, based on the position data and the position accuracy data, the estimated distance between the first endpoint and the second endpoint and the estimated position error for the estimated distance comprises:
   determining the estimated distance between the first endpoint and the second endpoint based on the first position data and the second position data; and determining the estimated position error for the estimated distance based on the first position accuracy data and the second position accuracy data.

5. The method of claim 3, wherein exchanging the position data and the position accuracy data with the second endpoint via the non-mmWave type channel of the V2X radio comprises:
transmitting the first position data and the first position accuracy data to the second endpoint via the non-mmWave type channel; and
receiving the second position data and the second position accuracy data from the second endpoint via the non-mmWave type channel.

6. The method of claim 1, wherein performing the beam alignment for the mmWave channel of the V2X radio based on the beamwidth setting to modify the operation of the V2X radio comprises:
sweeping a beam of the V2X radio to align the beam of the V2X radio with the second endpoint so that one or more beam lobes with a beamwidth determined by the beamwidth setting are selected for the mmWave channel of the V2X radio.

7. The method of claim 6, wherein the mmWave communication with the second endpoint is performed using the one or more beam lobes.

8. The method of claim 6, wherein the one or more beam lobes are selected at the first endpoint such that the beamwidth is maximized while a signal-to-noise ratio requirement is also met during the mmWave communication.

9. The method of claim 1, wherein the first endpoint is an ego vehicle and the second endpoint is a remote vehicle.

10. The method of claim 1, further comprising:
receiving V2X feedback data from the second endpoint via one or more of the non-mmWave type channel and the mmWave channel,
wherein the beamwidth setting for the mmWave channel of the V2X radio is adjusted further based on the V2X feedback data.

11. A system comprising:
an onboard vehicle computer system of a first endpoint including a non-transitory memory storing computer code which, when executed by the onboard vehicle computer system, causes the onboard vehicle computer system to:
exchange position data and position accuracy data with a second endpoint via a non-millimeter wave (non-mmWave) type channel of a vehicle-to-everything (V2X) radio;
adjust a beamwidth setting for a millimeter wave (mmWave) channel of the V2X radio based on the position data and the position accuracy data; and
perform a beam alignment for the mmWave channel of the V2X radio based on the beamwidth setting to modify an operation of the V2X radio so that the V2X radio exchanges a mmWave communication with the second endpoint using the beam alignment indicated by the beamwidth setting;
wherein the beamwidth setting provides an improved mmWave communication performance for the V2X radio that includes one or more of a reduction of beam alignment errors and a reduction of beam alignment overhead.

12. The system of claim 11, wherein the computer code, when executed by the onboard vehicle computer system, causes the onboard vehicle computer system to adjust the beamwidth setting for the mmWave channel of the V2X radio based on the position data and the position accuracy data at least by:
determining, based on the position data and the position accuracy data, an estimated distance between the first endpoint and the second endpoint and an estimated position error for the estimated distance; and
determining the beamwidth setting for the mmWave channel of the V2X radio based on the estimated distance and the estimated position error.

13. The system of claim 12, wherein the position data includes first position data describing a position of the first endpoint and second position data describing a position of the second endpoint, and the position accuracy data includes first position accuracy data describing an accuracy of the first position data and second position accuracy data describing an accuracy of the second position data.

14. The system of claim 13, wherein the computer code, when executed by the onboard vehicle computer system, causes the onboard vehicle computer system to determine, based on the position data and the position accuracy data, the estimated distance between the first endpoint and the second endpoint and the estimated position error for the estimated distance at least by:
determining the estimated distance between the first endpoint and the second endpoint based on the first position data and the second position data; and
determining the estimated position error for the estimated distance based on the first position accuracy data and the second position accuracy data.

15. The system of claim 13, wherein the computer code, when executed by the onboard vehicle computer system, causes the onboard vehicle computer system to exchange the position data and the position accuracy data with the second endpoint via the non-mmWave type channel of the V2X radio at least by:
transmitting the first position data and the first position accuracy data to the second endpoint via the non-mmWave type channel; and
receiving the second position data and the second position accuracy data from the second endpoint via the non-mmWave type channel.

16. The system of claim 11, wherein the computer code, when executed by the onboard vehicle computer system, causes the onboard vehicle computer system to perform the beam alignment for the mmWave channel of the V2X radio based on the beamwidth setting to modify the operation of the V2X radio at least by:
sweeping a beam of the V2X radio to align the beam of the V2X radio with the second endpoint so that one or more beam lobes with a beamwidth determined by the beamwidth setting are selected for the mmWave channel of the V2X radio.

17. The system of claim 16, wherein the mmWave communication with the second endpoint is performed using the one or more beam lobes.

18. The system of claim 16, wherein the one or more beam lobes are selected at the first endpoint such that the beamwidth is maximized while one or more of a communication range requirement and a signal-to-noise ratio requirement is also met during the mmWave communication.

19. A computer program product comprising a non-transitory memory of an onboard vehicle computer system of a first endpoint storing computer-executable code that, when executed by a processor, causes the processor to:

exchange position data and position accuracy data with a second endpoint via a non-millimeter wave (non-mmWave) type channel of a vehicle-to-everything (V2X) radio;

adjust a beamwidth setting for a millimeter wave (mmWave) channel of the V2X radio based on the position data and the position accuracy data; and perform a beam alignment for the mmWave channel of the V2X radio based on the beamwidth setting to modify an operation of the V2X radio so that the V2X radio exchanges a mmWave communication with the second endpoint using the beam alignment indicated by the beamwidth setting;

wherein the beamwidth setting provides an improved mmWave communication performance for the V2X radio that includes one or more of a reduction of beam alignment errors and a reduction of beam alignment overhead.

20. The computer program product of claim 19, wherein the computer-executable code, when executed by the processor, causes the processor to adjust the beamwidth setting for the mmWave channel of the V2X radio based on the position data and the position accuracy data at least by:

determining, based on the position data and the position accuracy data, an estimated distance between the first endpoint and the second endpoint and an estimated position error for the estimated distance; and determining the beamwidth setting for the mmWave channel of the V2X radio based on the estimated distance and the estimated position error.

* * * * *